United States Patent
Ceniza et al.

(10) Patent No.: US 11,260,707 B2
(45) Date of Patent: Mar. 1, 2022

(54) SYSTEM FOR DETECTING WHEN DOLLY TONGUE IN POSITION FOR LOCKING TO A VEHICLE

(71) Applicant: Toyota Motor Engineering & Manufacturing North America, Inc., Plano, TX (US)

(72) Inventors: Rommel B. Ceniza, Guelph (CA); Eddie Estanqueiro, Milton (CA); Jason L. Turner, Kitchener (CA); Jayson I. Piel, Hanover (CA)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 145 days.

(21) Appl. No.: 16/781,394

(22) Filed: Feb. 4, 2020

(65) Prior Publication Data

US 2021/0237523 A1 Aug. 5, 2021

(51) Int. Cl.
*B60D 1/02* (2006.01)
*B60D 1/36* (2006.01)
*B62B 5/00* (2006.01)
*B60D 1/24* (2006.01)

(52) U.S. Cl.
CPC .............. *B60D 1/025* (2013.01); *B60D 1/363* (2013.01); *B62B 5/0093* (2013.01); *B60D 1/249* (2013.01)

(58) Field of Classification Search
CPC ......... B60D 1/025; B60D 1/363; B60D 1/249
See application file for complete search history.

(56) References Cited

U.S. PATENT DOCUMENTS

| 4,073,507 | A | * | 2/1978 | Dingess | B60D 1/02 280/477 |
| 4,484,760 | A | | 11/1984 | Rach | |
| 5,346,239 | A | * | 9/1994 | Wohlhuter | B60D 1/62 280/420 |
| 7,850,190 | B2 | | 12/2010 | Ruckle et al. | |
| 8,047,756 | B2 | | 11/2011 | Tuffs et al. | |
| 9,469,514 | B1 | | 10/2016 | Hendricks | |
| 9,864,371 | B2 | | 1/2018 | Douglas et al. | |

(Continued)

FOREIGN PATENT DOCUMENTS

EP     3047986 A1  *  7/2016  ............... B60D 1/62

OTHER PUBLICATIONS

"Tugger AGVs", Bastian Solutions, 2019 (https://www.bastiansolutions.com/solutions/technology/automated-guidedvehicles/tugger/ (last downloaded Feb. 3, 2020) (7 pages).

*Primary Examiner* — Minnah L Seoh
*Assistant Examiner* — Abigail R Hymel
(74) *Attorney, Agent, or Firm* — Christopher G. Darrow; Darrow Mustafa PC

(57) ABSTRACT

A vehicle is structured for exerting a force on a dolly to move the dolly along a ground surface includes a locking pin mechanism having a locking pin, and a dolly tongue receptacle coupled to the locking pin mechanism so as to be movable with respect to the locking pin mechanism to a first position and a second position. A switch is coupled to the dolly tongue receptacle and structured to be operated by movement of the dolly tongue receptacle from the first position to the second position. The locking pin mechanism is structured to extend the locking pin into an opening formed in the portion of the dolly tongue responsive to operation of the switch.

9 Claims, 6 Drawing Sheets

(56) References Cited

U.S. PATENT DOCUMENTS

| | | | |
|---|---|---|---|
| 2003/0178810 A1* | 9/2003 | Reiter | B60D 1/02 |
| | | | 280/477 |
| 2013/0277943 A1 | 10/2013 | Wendte et al. | |
| 2017/0182924 A1 | 6/2017 | Lendo et al. | |

* cited by examiner

SYSTEM FOR DETECTING WHEN DOLLY TONGUE IN POSITION FOR LOCKING TO A VEHICLE

TECHNICAL FIELD

The present invention relates to a vehicle structured for towing or moving a transport dolly and, more particularly, to systems and methods for determining when a dolly tongue of a transport dolly is in a position to be engaged by a locking mechanism to secure the dolly to the vehicle.

BACKGROUND

An automated guided vehicle (AGV) may be configured to automatically maneuver to engage a dolly tongue of a transport dolly. When the dolly tongue is engaged, the AGV may activate a coupling mechanism to secure the dolly tongue to the AGV. However, in some such systems, it may be difficult to determine when the dolly tongue is in the correct position for activation of the coupling mechanism. Also, it is undesirable to engage the coupling mechanism when the dolly tongue appears to be in the correct engagement position, but is actually out of position.

SUMMARY

In one aspect of the embodiments described herein, a vehicle is structured for exerting a force on a dolly to move the dolly along around surface. The vehicle includes a locking pin mechanism having a locking pin, and a dolly tongue receptacle coupled to the locking pin mechanism so as to be movable with respect to the locking pin mechanism to a first position and a second position. A switch is coupled to the dolly tongue receptacle and structured to be operated by movement of the dolly tongue receptacle from the first position to the second position. The locking pin mechanism is structured to extend the locking pin into an opening formed in the portion of the dolly tongue responsive to operation of the switch.

DETAILED DESCRIPTION

Figure 1:
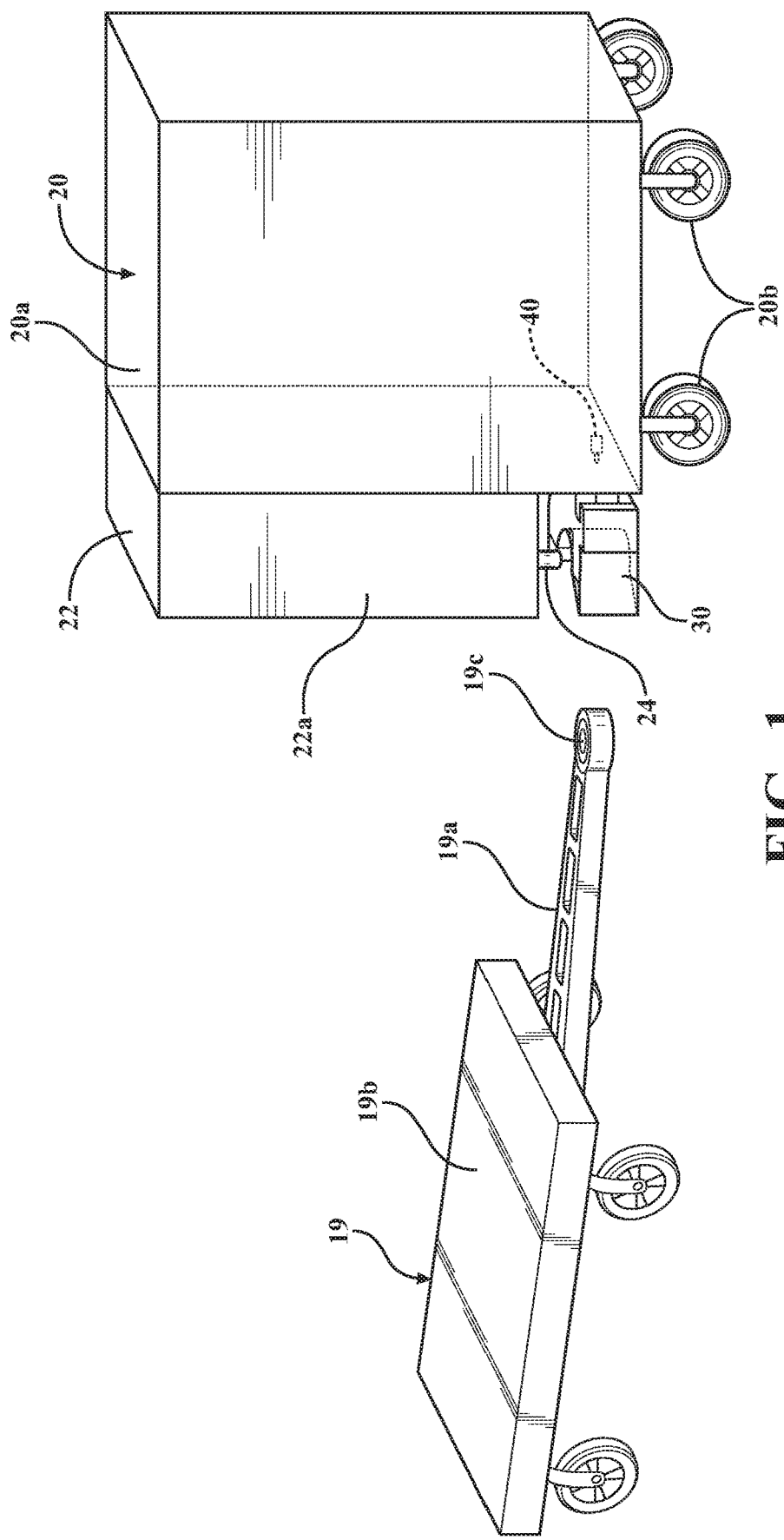
FIG. 1 is a schematic perspective view of a vehicle in accordance with an embodiment described herein along with a transport dolly, the vehicle including a locking pin mechanism configured for manipulating a locking pin to engage a tongue of the transport dolly.

Embodiments described herein relate to a vehicle is structured for exerting a force on a dolly to move the dolly along aground surface. The vehicle includes a locking pin mechanism having a locking pin, and a dolly tongue receptacle coupled to the locking pin mechanism so as to be movable with respect to the locking pin mechanism to a first position and a second position. A switch is coupled to the dolly tongue receptacle and structured to be operated by movement of the dolly tongue receptacle from the first position to the second position. The locking pin mechanism is structured to extend the locking pin therefrom into an opening formed in the portion of the dolly tongue responsive to operation of the switch. In particular embodiments, a sensor may be coupled to the dolly tongue receptacle. The sensor may be configured to detect a portion of the dolly tongue in an engageable or lockable position in the dolly tongue receptacle. The locking pin mechanism is operated to extend the locking pin therefrom into an opening formed in the portion of the dolly tongue responsive to both operation of the switch and detection of the dolly tongue in an engageable position in the dolly tongue receptacle.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Unless otherwise noted, similar reference characters are used to describe similar features on separate elements and/or embodiments.

Figure 1A:
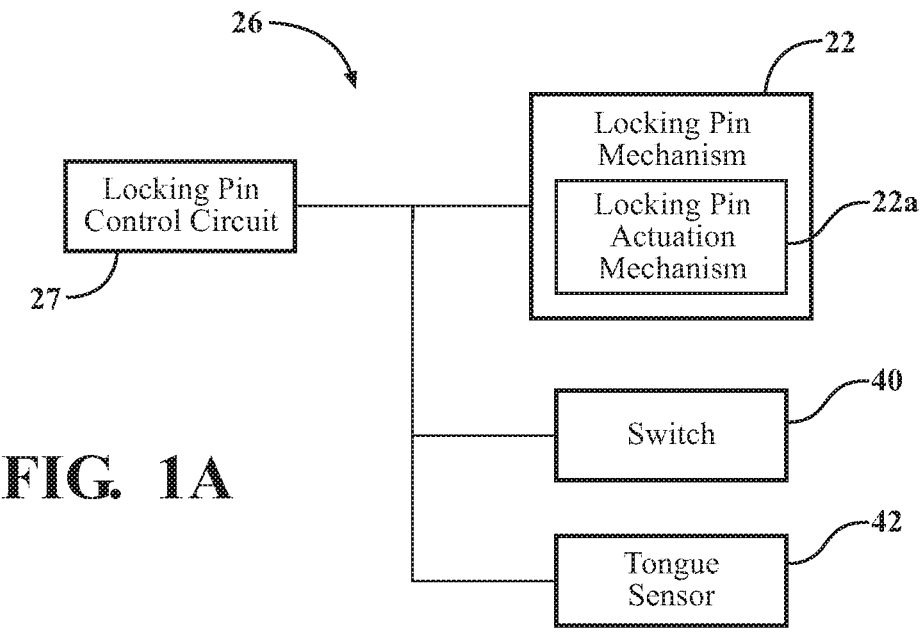
FIG. 1A is a block schematic diagram of a system usable for controlling operation of the vehicle locking pin mechanism of FIG. 2.

FIG. 1 is a schematic perspective view of a vehicle 20 in accordance with an embodiment described herein, including a locking pin mechanism 22 configured for manipulating a locking pin 24 to engage a rotatable tongue 19a of a transport dolly 19. The vehicle 20 may be a ground vehicle (such as an automated ground vehicle (AGV), for example) configured to be coupled to the transport dolly 19 for exerting a force on the dolly 19 to move the dolly along a ground surface. FIG. 1A is a block schematic diagram of a system 26 usable for controlling operation of the vehicle locking pin mechanism 22.

The dolly 19 may include a loading portion 19b structured for receiving goods to be transported. A portion of the tongue 19a may have an opening 19c formed therein and structured to receive the locking pin 24 which is extendibly/retractably mounted on the vehicle 20. When the locking pin 24 is extended into the opening 19c, the dolly 19 is coupled to the vehicle 20. The vehicle 20 may then tow or push the dolly 19 to a desired position or destination for loading or unloading of goods onto the dolly 19.

The vehicle 20 may include a vehicle body 20a mounted on wheels 20b. A drive system (not shown) may be powered by a power source (such as a propane fueled engine or a battery) (not shown) to drive the wheels 20b to propel the vehicle 20. The vehicle 20 may be autonomously guided under the control of a suitably configured autonomous guidance module and processors (not shown), or the vehicle movements may be controlled manually through radio control or some other means.

The vehicle 20 may include a locking pin mechanism 22 attached to (or incorporated into) the vehicle body 20a. The locking pin mechanism 22 may include locking pin 24 and a locking pin actuation mechanism 22a structured to extend the locking pin 24 from a retracted position (i.e., a position outside the opening 19c formed in the tongue 19a) to an extended position where a portion of locking pin 24 resides inside the opening 19c, thereby connecting the dolly tongue 19a to the vehicle 20. The locking pin actuation mechanism 22a may also be structured to retract the locking pin 24 from the opening 19c formed in the tongue 19a back to the retracted position. The locking pin 24 may be extended and retracted responsive to associated command signals received from a locking pin control circuit 27.

In one or more arrangements, the locking pin actuation mechanism 22a may be in the form of a conventional pneumatic cylinder mechanism or system, with the locking pin 24 formed by a piston shaft of the pneumatic cylinder attached to an end of the piston shaft. However, the locking pin actuation mechanism 22a may alternatively be in the form of a solenoid having an actuatable locking pin/shaft extending therefrom, or any other suitable form.

The locking pin mechanism 22 may be oriented so as to extend the locking pin 24 in a vertically downward direction responsive to the command signal. The locking pin 24 may be extended downwardly into the opening in the dolly tongue 19a when the portion of the dolly tongue 19a including the opening 19c is determined to be in an engageable position in a dolly tongue receptacle 30, as described herein.

The dolly tongue receptacle 30 may be operably coupled to the Locking pin mechanism 22 so as to be movable with respect to the locking pin mechanism 22 to a first position (FIGS. 2A-2B) spaced apart from the vehicle body 20a and a second position (FIGS. 4A-4B) in direct physical contact with the vehicle body 20a. The term "operably coupled," as used throughout this description, can include direct or indirect connections, including connections without direct physical contact.

Figure 2B:
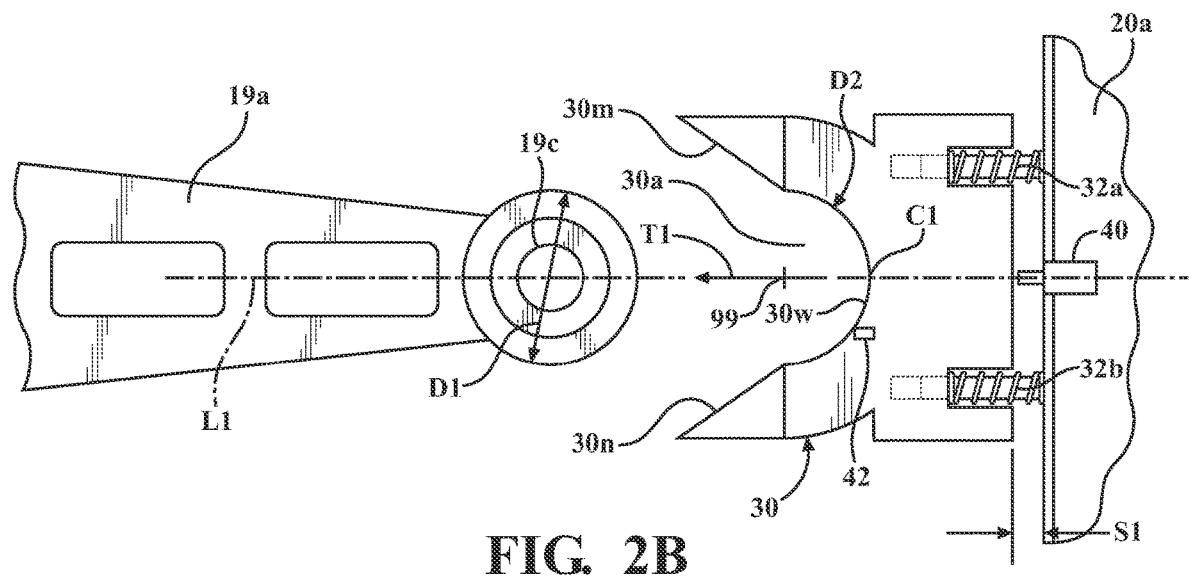
FIG. 2B is a schematic plan view of portions of the vehicle and dolly shown in FIG. 2A.
Figure 2A:
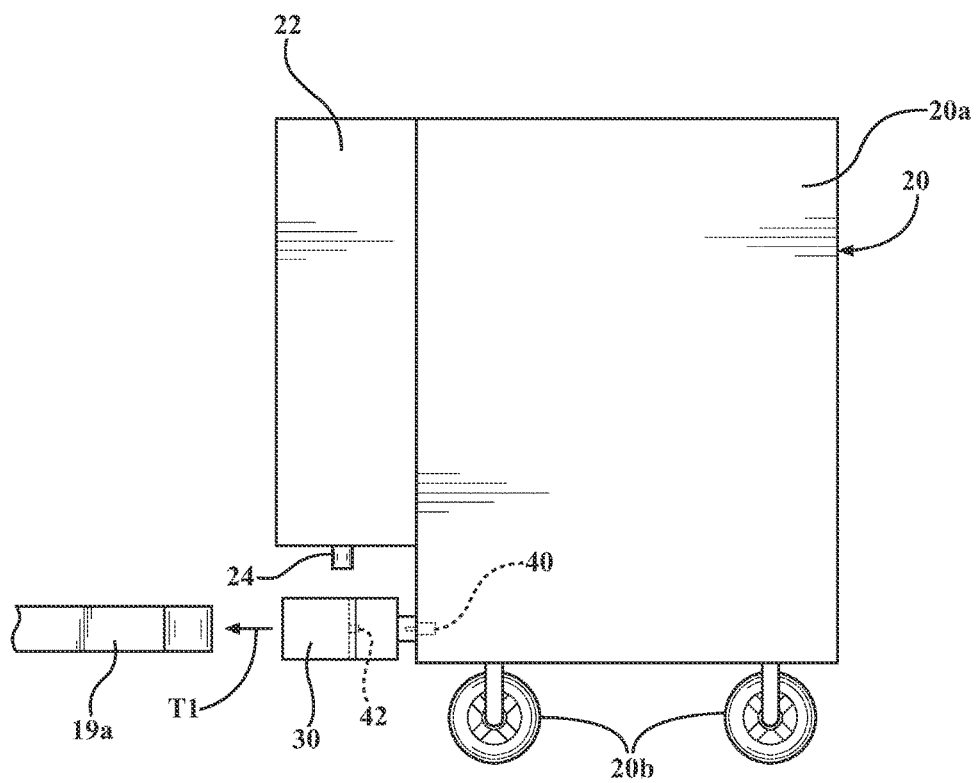
FIG. 2A is a schematic side view of the vehicle of FIG. 1 including a locking pin mechanism in accordance with an embodiment described herein, shown approaching an end of the tongue of the transport dolly.

FIG. 2A is a schematic side view of the vehicle of FIG. 1 including a locking pin mechanism 22 and dolly tongue receptacle 30 in accordance with an embodiment described herein, shown approaching an end of the tongue 19a of the transport dolly 19. FIG. 2B is a schematic plan view of the vehicle and dolly shown in FIG. 2A. As seen in FIGS. 2A-2B, the dolly tongue receptacle 30 may be spaced apart a distance S1 from the vehicle body 20a when the dolly tongue receptacle 30 is in the first position. The receptacle 30 may include a cavity 30a structured to receive therein the portion of the dolly tongue 19a including the opening 19c.

Referring to FIG. 2B, the vehicle 20 may include at least one spring member 32 interposed between the body 20a of the vehicle 20 and the dolly tongue receptacle 30. The embodiment shown includes a pair of spaced apart spring members 32a, 32b interposed between the vehicle body 20a and the dolly tongue receptacle 30. The spring members 32a, 32b may be structured to exert a force biasing the dolly tongue receptacle 30 in away from the vehicle body 20a, in a direction from the second position toward the first position.

In one or more arrangements, and as seen in the drawings, the portion of the dolly tongue 19a to be received in the cavity 30a of the dolly tongue receptacle 30 may be shaped as a portion of a cylinder having an outer diameter D1. Also, a wall 30w of the cavity 30a may have a diameter D2 equal or substantially equal to the dolly tongue outer diameter D1. As used herein, the term "substantially" includes exactly the term it modifies and slight variations therefrom. Thus, the term "substantially equal" means exactly equal and slight variations therefrom. In this particular example, slight variations therefrom can include values within normal manufacturing tolerances for the dimensions, materials, and methods used in fabricating the dolly tongue receptacle 30.

In one or more arrangements, the dolly tongue receptacle 30 may include lead-in surfaces 30m and 30n positioned along opposite sides of the cavity 30a and structured to channel the portion of the dolly tongue 19a including the opening 19c into the cavity 30a.

A switch 40 may be operably coupled to the dolly tongue receptacle 30. The switch 40 may be structured to be operable by movement of the dolly tongue receptacle 30 from the first position to the second position. In one or more arrangements, the switch 40 may be a limit switch. Alternatively, the switch 40 may be any other type of switch suitable for the purposes described herein. In the embodiment shown, switch 40 is installed in vehicle body 20a.

In one or more arrangements, the wall 30w of the cavity 30a may have a diameter D2 equal or substantially equal to the dolly tongue outer diameter D1, as previously described. In addition, the dolly tongue receptacle 30 and its cavity 30a may be structured so that when the portion of the dolly tongue 19a including the opening 19c is seated in the dolly tongue receptacle cavity 30a and pushes the dolly tongue receptacle 30 from its first position to the second position shown in FIGS. 4A and 4B, the opening 19c in the portion of the dolly tongue 19a is in a position for the locking pin 24 to be dropped or inserted into the opening 19c. Also, the tongue opening 19c and the locking pin 24 may be sized so that the locking pin 24 may be inserted into the opening when the dolly tongue receptacle 30 is pushed into the second position.

Figure 6:
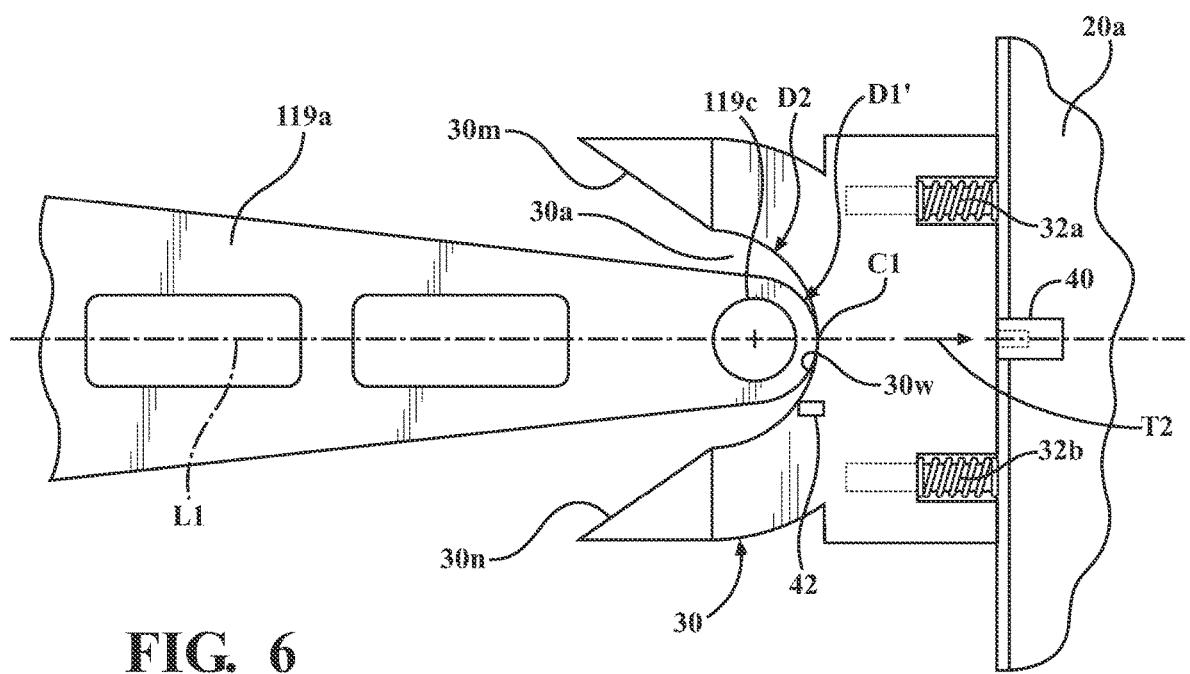
FIG. 6 is a schematic plan view of portions of an arrangement of a dolly tongue and dolly tongue receptacle, in which a dolly tongue outer diameter D1' is less than a diameter D2 of a dolly tongue receptacle cavity wall.

However, as seen in FIG. 6, in certain cases a dolly tongue outer diameter D1' may be less than the cavity wall diameter D2, yet still be able to push on the dolly tongue receptacle wall 30w to operate the switch 40, thereby causing the locking pin 24 to drop. The end of the dolly tongue 119a may be guided to the center C1 of the wall by the shapes of the lead-in surfaces 30m and 30n and wall 30w and may press against the center C1 of the wall 30w to move the dolly tongue receptacle 30, thereby operating the switch 40. In such a case, the locking pin outer diameter may be too large to enter the opening 19c, or the locking pin 24 and the opening 19c may be off-center with respect to each other. Either situation may prevent insertion of the locking pin 24 into the opening 19c. In addition, it is generally undesirable for the locking pin 24 to be extended when there is no portion of the tongue 19a residing in the cavity 30a.

In one or more particular arrangements, to help ensure that a portion of the tongue 19a having the same (or substantially the same) diameter D2 as the cavity wall 30w is properly seated in the cavity 30a in contact with the wall 30w along the length of the wall, a sensor 42 may be mounted along the wall 30w (or recessed in the receptacle 30 opposite the wall) to detect an engageable positioning of the portion of the dolly tongue 19a in the dolly tongue receptacle cavity 30a when the switch 40 is operated. An engageable position of the portion of the dolly tongue 19a in the receptacle cavity 30a may be a position in which the portion of the dolly tongue is detected to be in physical contact with the wall 30w opposite the sensor 42 when the dolly tongue receptacle 30 is in the second position.

Figure 1B:
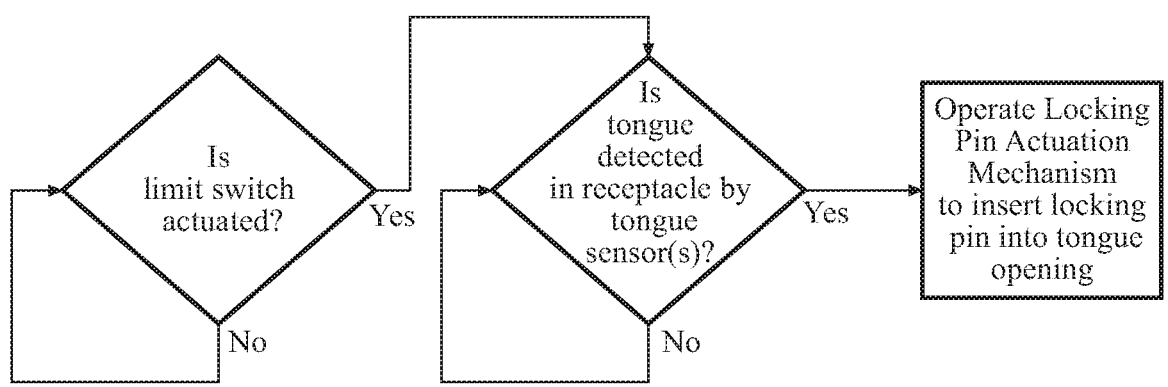
FIG. 1B is a flow diagram showing steps for controlling operation of a locking pin mechanism responsive to both actuation of a switch and detection of a portion of a dolly tongue in a locking pin receptacle cavity.
Figure 4B:
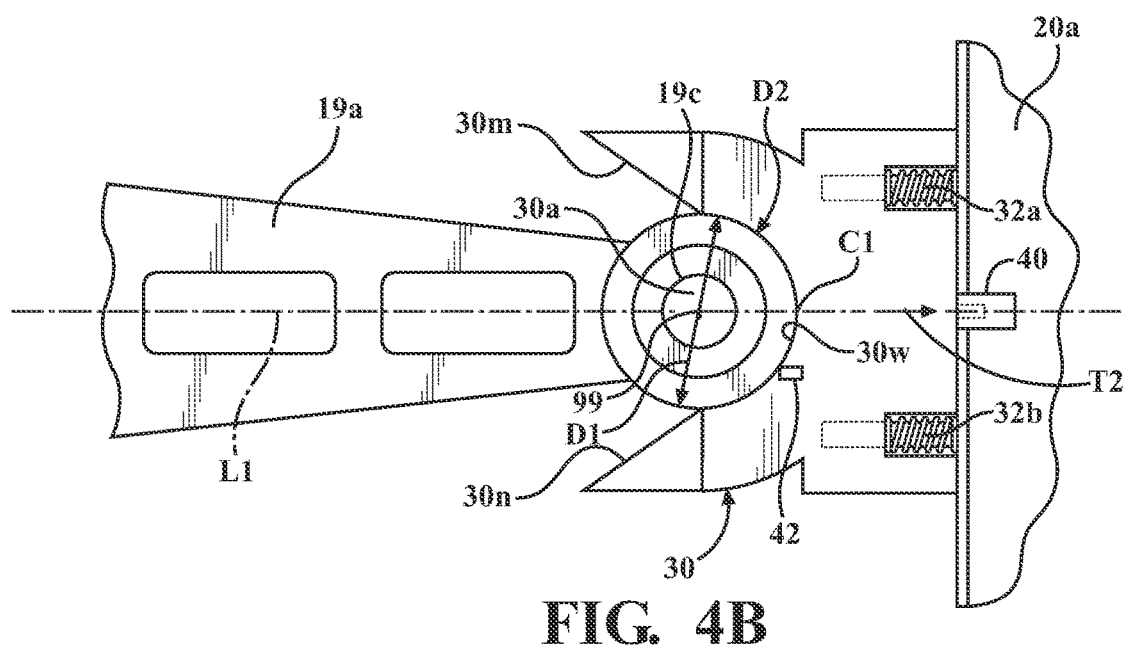
FIG. 4B is a schematic plan view of portions of the arrangement shown in FIG. 4A.

The sensor 42 may be configured to determine that the portion of the dolly tongue 19a in the receptacle cavity 30a is in the engageable position when the portion of the dolly tongue 19a is in direct physical contact with the cavity wall 30w and the receptacle 30 is in the second position, as shown in FIG. 4B. In embodiments using the sensor 42, the locking pin mechanism 22 may be operable to extend the locking pin 24 into the opening 19c formed in the portion of the dolly tongue 19a responsive to both operation of the switch 40 and detection of the portion of the dolly tongue 19a in an engageable position in the cavity 30a. This function may be provided by a locking pin control circuit 27 configured to perform the steps shown in FIG. 1B. When the switch 40 has been operated, it may be determined if the sensor 42 has detected the portion of the dolly tongue 19a in an engageable position in the cavity 30a. If the sensor 42 has detected the portion of the dolly tongue 19a in an engageable position in the cavity 30a, the locking pin control circuit 27 may send a signal operating the locking pin actuation mechanism 22a to insert the locking pin 24 into the tongue opening 19c.

To prevent a situation as shown in FIG. 6 where an "offsize" dolly tongue 119 is inserted into the cavity 30a and operates the switch 40, the sensor 42 may be located offset from a line L1 extending from a center 99 of the diameter D2 of the wall 30w of the cavity 30a thru wall center C1, and bisecting the wall 30w of the cavity 30a. This positioning of the sensor 42 helps ensure that a properly-sized portion of the dolly tongue 19a is seated in the cavity 30a to push against the dolly tongue receptacle 30, because a smaller "offsize" end of tongue 119 as seen in FIG. 6 will not trigger a sensor configured to detect that the portion of the tongue is in position only when the portion of the tongue is in direct contact with the wall 30w. This arrangement may help prevent unintended attempted insertion of the locking pin 24 into an offsize or unaligned tongue opening.

The locking pin mechanism 22 may be controlled using the switch 40 alone, or the locking pin mechanism may be controlled using the sensor 42 in conjunction with the switch 40, as just described.

Operation of the locking pin mechanism 22 in conjunction with both a switch 40 and a sensor 42 will now be discussed with reference to FIGS. 1A-5.

The vehicle 20 may be autonomously guided to a position where the portion of the tongue 19a including the opening 19c resides in the dolly tongue receptacle cavity 30a. Methods and systems are known in the pertinent art for autonomously guiding a vehicle into a position where a portion of the vehicle can engage a portion of a tongue of a transport dolly, to couple the dolly to the vehicle for subsequent movement of the dolly. Such methods and systems will not be described further herein. The embodiments described herein are directed to determining (using the elements and methods set forth previously) when the portion of the dolly tongue 19a including the opening 19c is in position for a locking pin 24 to drop or be lowered into the opening 19c, and to operating the locking pin actuation mechanism 22a to drop or lower the locking pin 24 into the tongue opening 19c when the portion of the dolly tongue 19a is in position.

Figure 3B:
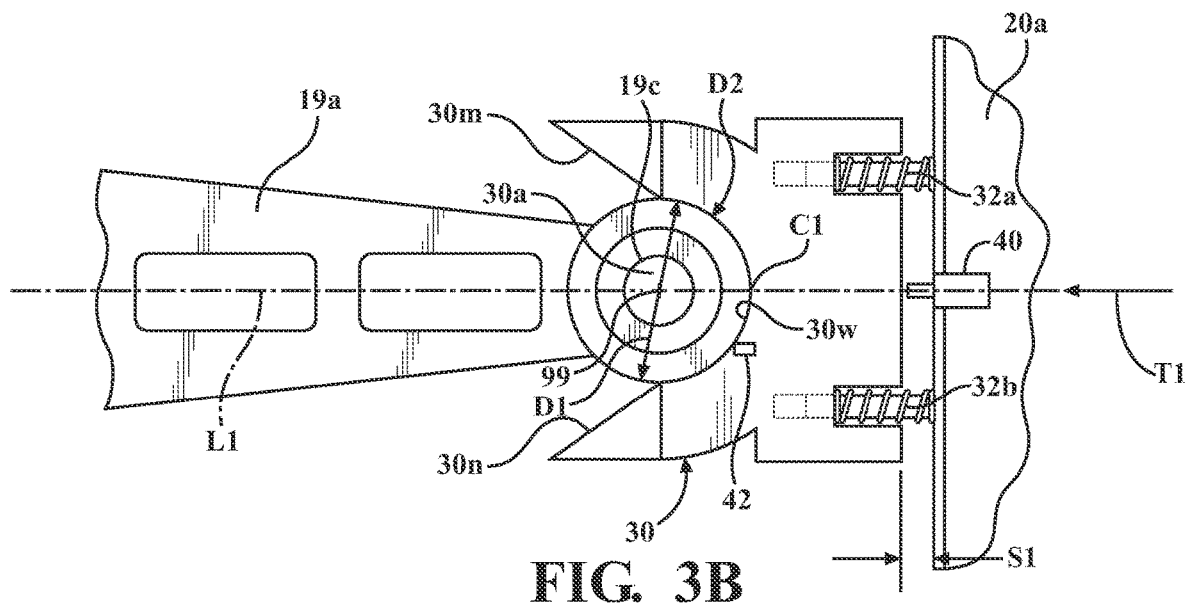
FIG. 3B is a schematic plan view of portions of the arrangement shown in FIG. 3A.
Figure 3A:
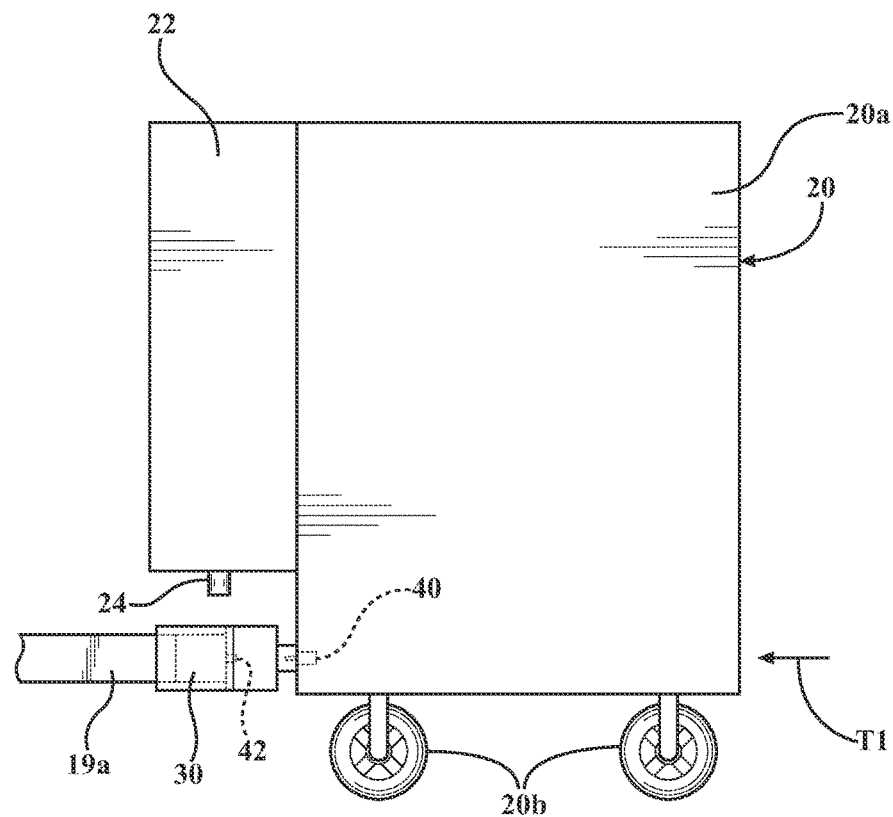
FIG. 3A is the view of FIG. 2A showing a portion of the dolly tongue just after being seated in a cavity of the dolly tongue receptacle.

Referring to FIGS. 2A and 2B, the vehicle 20 may be guided toward the dolly 19 so that the dolly tongue receptacle 30 approaches the portion of the tongue 19a including opening 19c. In FIGS. 3A-3B, the vehicle 20 has moved in direction T1 toward the dolly until the portion of the tongue 19a including opening 19c has become seated in the cavity 30a.

Figure 4A:
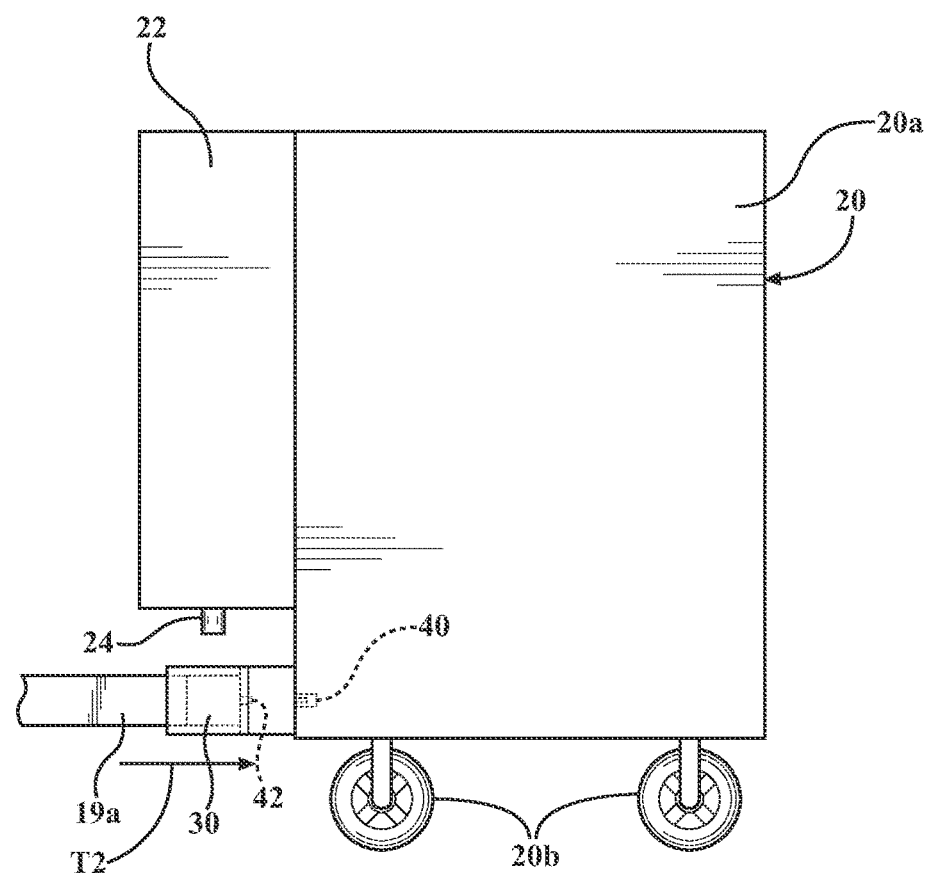
FIG. 4A is the view of FIG. 3A showing operation of a switch on the vehicle by moving the dolly tongue receptacle toward the body of the vehicle.
Figure 5:
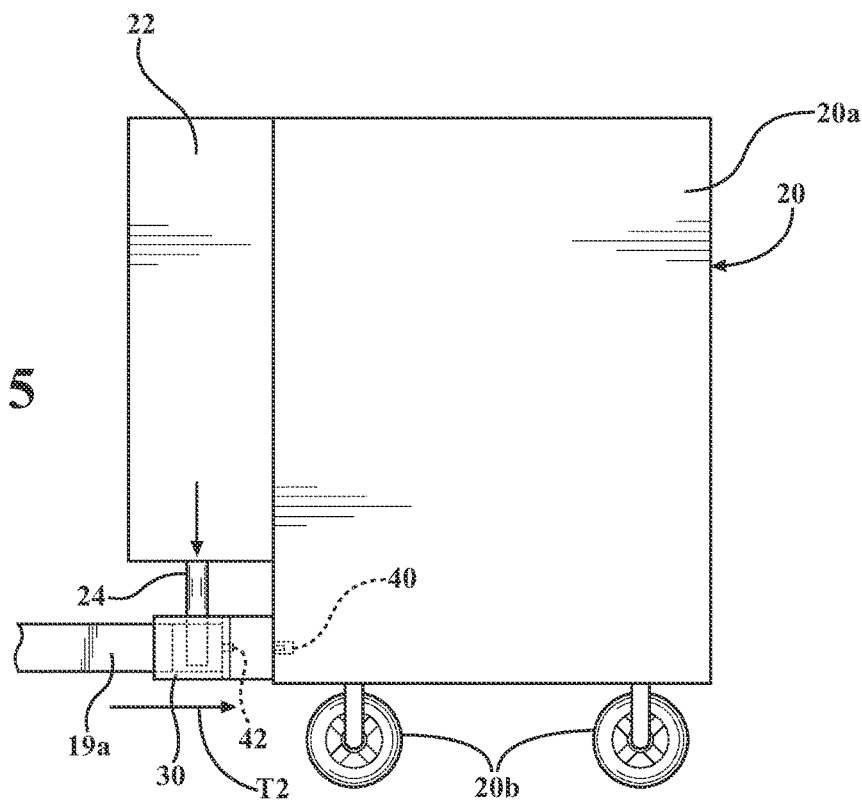
FIG. 5 is the view of FIG. 4A showing insertion of a locking pin into an opening in the dolly tongue responsive to operation of the switch as shown in FIGS. 4A-4B.

In FIGS. 4A-4B, continued motion of the vehicle 20 toward the tongue 19a causes the tongue to push the receptacle 30 in direction T2 opposite T1 toward the vehicle body 20a. Movement of the receptacle 30 into contact with the vehicle body operates the switch 40. As seen in FIG. 1A, when it is determined that the switch 40 has been operated, the locking pin control circuit may determine if the sensor 42 has detected that the portion of the tongue 19a including the opening 19c is in physical contact with the wall 30w opposite the sensor 42 (i.e., if a tongue end of the proper diameter D1 resides in the cavity 30a). If the switch 40 has been operated and the sensor 42 detects that that the portion of the tongue 19a including the opening 19c is in physical contact with the wall 30w opposite the sensor 42, the locking pin control circuit 27 may operate the locking pin actuation mechanism 22a to insert the locking pin 24 into tongue opening 10c, as shown in FIG. 5.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A vehicle structured for exerting a force on a dolly to move the dolly along a ground surface, the vehicle comprising:
   a locking pin mechanism including a locking pin;
   a dolly tongue receptacle coupled to the locking pin mechanism so as to be movable with respect to the locking pin mechanism between a first position and a second position; and
   a switch coupled to the dolly tongue receptacle and structured to be operated by movement of the dolly tongue receptacle from the first position to the second position responsive to a force exerted on the receptacle by a dolly tongue in direct contact with the receptacle, wherein the locking pin mechanism is structured to extend the locking pin therefrom responsive to operation of the switch.

2. The vehicle of claim 1 wherein the dolly tongue receptacle includes a cavity structured to receive a portion of a dolly tongue therein, wherein the vehicle further comprises at least one sensor configured to detect an engageable positioning of the portion of the dolly tongue in the dolly tongue receptacle cavity when the switch is operated, and wherein the locking pin mechanism is structured to be operable to extend the locking pin into an opening formed in the portion of the dolly tongue responsive to both operation of the switch and detection of the portion of the dolly tongue in an engageable position in the cavity.

3. The vehicle of claim 2 wherein the at least one sensor is configured to determine that the portion of the dolly tongue is in the engageable position when the portion of the dolly tongue is in direct physical contact with a wall of the cavity.

4. The vehicle of claim 2 wherein the portion of the dolly tongue is shaped as a portion of a cylinder and has an outer diameter, and a wall of the cavity has a diameter equal or substantially equal to the outer diameter of the portion of the dolly tongue.

5. The vehicle of claim 4 wherein the at least one sensor is positioned offset from a line extending from a center of the diameter of the wall of the cavity, and bisecting the wall of the cavity.

6. The vehicle of claim 2 wherein the at least one sensor is a proximity sensor.

7. The vehicle of claim 1 wherein the dolly tongue receptacle is spaced apart from a body of the vehicle when the dolly tongue receptacle is in the first position, and wherein the vehicle further comprises at least one spring member interposed between the body of the vehicle and the dolly tongue receptacle and structured to exert a force which moves the dolly tongue receptacle in a direction away from the vehicle body when the dolly tongue is not in contact with the receptacle.

8. The vehicle of claim 7 structured so that the dolly tongue receptacle is in direct physical contact with the body of the vehicle when the dolly tongue receptacle is in the second position.

9. The vehicle of claim 1 wherein the switch is a limit switch.

* * * * *